US010132276B2

United States Patent
Baek et al.

(10) Patent No.: US 10,132,276 B2
(45) Date of Patent: Nov. 20, 2018

(54) DRAWER TYPE AIR CLEANER HAVING INCREASED MAINTENANCE CONVENIENCE, AND INTAKE SYSTEM AND VEHICLE HAVING THE SAME

(71) Applicants: Hyundai Motor Company, Seoul (KR); Kia Motors Corporation, Seoul (KR)

(72) Inventors: Sang-Cheol Baek, Gyeonggi-do (KR); Young-CHan Jeon, Gangwon-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 15/351,741

(22) Filed: Nov. 15, 2016

(65) Prior Publication Data
US 2017/0191452 A1    Jul. 6, 2017

(30) Foreign Application Priority Data

Dec. 31, 2015    (KR) .................. 10-2015-0190538

(51) Int. Cl.
*F02M 35/024*    (2006.01)
*F02M 35/02*    (2006.01)
(Continued)

(52) U.S. Cl.
CPC ....... *F02M 35/0201* (2013.01); *B01D 46/001* (2013.01); *B01D 46/0005* (2013.01);
(Continued)

(58) Field of Classification Search
CPC ............ B01D 46/0004; B01D 46/0005; B01D 46/0006; B60H 1/00514; B60H 3/0616; B60H 1/00378; E04B 1/7076; F02M 35/024

USPC ...... 55/385.3, 492, 493, 502, 503, 504, 497, 55/521, 478, 480, 481; 123/198 E, 123/195 C, 184.57, 41.7, 41.31; 454/276, 454/271; 180/68.2, 68.3, 68.5
See application file for complete search history.

(56) References Cited

U.S. PATENT DOCUMENTS 6,217,627 B1 *  4/2001  Vyskocil ............ B01D 46/0005
                                                         123/198 E
6,422,197 B1 *  7/2002  Amann ................ F02M 35/024
                                                         123/198 E
(Continued)

FOREIGN PATENT DOCUMENTS

JP    05-076508 U    10/1993
JP    2001-173531 A    6/2001
(Continued)

*Primary Examiner* — Duane Smith
*Assistant Examiner* — Minh Chau T Pham
(74) *Attorney, Agent, or Firm* — Mintz Levin Cohn Ferris Glovsky and Popeo, P.C.; Peter F. Corless

(57) ABSTRACT

A drawer type air cleaner having increased maintenance convenience is provided. The drawer type air cleaner includes a door that is configured to open or close an opening of filter receiving cavity formed in air cleaner body that suctions exterior air and discharges fresh air and a filter disposed in the filter receiving cavity and configured to filter out foreign substances from the exterior air and convert the exterior air into fresh air. The filter having a packing is disposed in the filter receiving cavity and thus provides an airtight seal between the filter and the filter receiving cavity. A filter protector is interlocked with an operation of closing the door to convert the filter from an incompletely coupled state when the filter disposed in the filter receiving cavity and is unable to compress the packing into a fully coupled state to a state when the filter compresses the packing.

16 Claims, 13 Drawing Sheets

(51) Int. Cl.
    *B01D 46/00*       (2006.01)
    *F02M 35/04*      (2006.01)
    *B01D 46/10*       (2006.01)

(52) U.S. Cl.
    CPC ..... *B01D 46/0006* (2013.01); *B01D 46/0097* (2013.01); *B01D 46/10* (2013.01); *F02M 35/024* (2013.01); *F02M 35/048* (2013.01); *B01D 2265/024* (2013.01); *B01D 2279/40* (2013.01); *B01D 2279/60* (2013.01)

(56) References Cited

U.S. PATENT DOCUMENTS

| | | | |
|---|---|---|---|
| 6,440,189 B1 * | 8/2002 | Sugano | B60H 1/00514 123/198 E |
| 6,623,350 B2 * | 9/2003 | Goupil, Jr. | B60H 3/0616 454/158 |
| 6,808,547 B2 * | 10/2004 | Ota | B01D 46/0006 55/478 |
| 6,878,176 B2 * | 4/2005 | Roudet | B60H 1/00378 55/357 |
| 7,128,643 B2 * | 10/2006 | Beliveau | E04B 1/7076 454/276 |
| 7,323,029 B2 * | 1/2008 | Engelland | B01D 46/0004 123/198 E |
| 2008/0110146 A1 * | 5/2008 | Germain | B01D 46/0005 55/385.3 |
| 2012/0240540 A1 | 9/2012 | Metzger et al. | |

FOREIGN PATENT DOCUMENTS

| | | | |
|---|---|---|---|
| JP | 2010-242667 A | | 10/2010 |
| KR | 10-1449321 B1 | | 10/2014 |
| KR | 10-1536603 B1 | | 7/2015 |

\* cited by examiner

SECTION A-A

DRAWER TYPE AIR CLEANER HAVING INCREASED MAINTENANCE CONVENIENCE, AND INTAKE SYSTEM AND VEHICLE HAVING THE SAME

CROSS-REFERENCE TO RELATED APPLICATIONS

This application claims priority to Korean Patent Application No. 10-2015-0190538, filed on Dec. 31, 2015, which is incorporated herein by reference in its entirety.

BACKGROUND

Field of the Invention

The present invention relates to an air cleaner and more particularly, to a drawer type air cleaner that provides an airtight seal after replacement of a filter has been performed by automatically closing a door, thus enhancing convenience in maintenance work, and to an intake system and a vehicle having the same.

Description of Related Art

Generally, an engine compartment for a vehicle includes an intake system that supplies fresh air to an engine. The intake system includes an air cleaner which filters out foreign substances from exterior air introduced into the intake system and thus forms clean air. As an example of the air cleaner, a drawer type air cleaner includes a hinged door coupled to an opening of a drawer type filter receiving cavity of a filter body, an air purification filter which is disposed in the filter receiving cavity of the filter body and a filter protector which is coupled to the door and the filter to prevent failure in securing an airtight seal of the filter due to mistake or carelessness of a worker after replacement of the filter.

Typically, the filter protector is directly formed on the filter casing and the door and thus has an advantage of a simplified structure. For example, the filter protector restricts closing of the door when the filter does not normally form a sealing state by compression of a rubber packing in the filter receiving cavity of the filter body. Accordingly, an incorrect filter replacement due to mistake or carelessness of the worker is prevented.

Consequently, the drawer type air cleaner improves convenience in maintenance due to the filter protector functions to prevent a filter assembly failure due to a mistake or carelessness of the worker. However, the shape of the filter protector that is directly formed on the filter casing and the door is limited based on the shapes and structures of the filter casing and the door. Accordingly, the degree of freedom in design for high durability is limited.

When the filter protector does not have high durability, the filter protector may be damaged, (e.g., when the worker forcibly manipulate the door during maintenance work in). In particular, there is an increased possibility of incorrect assembly of the filter replaced during the maintenance work. When the packing in the air cleaner is insufficiently compressed, reliable sealing between a clean side (e.g., cavity around the filter) and a dirty side (e.g., cavity around the filter casing) may not be formed. As a result, due to leakage of noise from the air cleaner, interior and exterior noise of the vehicle may be increased.

Moreover, when the airtightness is secured by insufficient sealing, there is an increased possibility of foreign substances being drawn into the clean side. The foreign substances drawn into the clean side may cause abrasion of the engine or damage to an air flow sensor (AFS) of the intake system. Accordingly, the lifespan of the engine may be reduced or a malfunction of the vehicle may occur or an exhaust emissions may increase.

The matters disclosed in this section are merely for enhancement of understanding of the general background of the invention and should not be taken as an acknowledgment or any form of suggestion that the matters form the related art already known to a person skilled in the art.

SUMMARY

The present invention provides a drawer type air cleaner with a filter protector that includes a positioning rib disposed on a door and a locking handle disposed on a filter casing and configured to operated complementary to each other. The locking handle may be automatically converted from an incomplete lock position to a full lock position by the operation of the positioning rib when the door is closed. In particular, since the position locking handle is automatically converted to the full lock position, when maintenance or replacement of the filter is performed, the airtight assembled state of the filter may be secured without requiring a worker's visual check, thus improving the ease of maintenance work and to an intake system and a vehicle having the same.

In an exemplary embodiment of the present invention, a drawer type air cleaner having increased maintenance convenience may include a door configured to open or close an opening of a filter receiving cavity formed in an air cleaner body that suctions exterior air and discharges fresh air, a filter may be disposed in the filter receiving cavity and configured to filter out foreign substances from the exterior air and convert the exterior air into fresh air. The filter may compress a packing when the filter is disposed in the filter receiving cavity and thus an airtight seal may be secured between the filter and the filter receiving cavity. A filter protector configured to be interlocked with an operation of closing the door to convert the filter from an incompletely coupled state when the filter disposed in the filter receiving cavity is unable to compress the packing into a fully coupled state in when the filter compresses the packing.

The filter protector may include a positioning rib disposed on an interior side of the door and a locking handle rotatably coupled to a side surface of the filter to enable the filter to compress the packing onto an interior surface of the filter receiving cavity. The positioning rib and the locking handle may include a plurality of positioning ribs and a plurality locking handles that are disposed in pairs at positions adjacent to each other. The positioning rib may include a base protrusion and a manipulation protrusion bent from the base protrusion at about 90 degrees. The manipulation protrusion may be configured to convert, by the operation of closing the door, a position of the handle from an incomplete manipulation position unable of compressing the packing to a full manipulation position. The manipulation protrusion may include a push-up body and a support body that are divided from each other by a stopper.

The push-up body may be configured to rotate (e.g., push) the handle upward and the support body may support the handle. The handle may include a locking protrusion, wherein the locking protrusion may include a positioning depression configured to receive the push-up body upon insertion therein and an interior inclined surface that contacts with the push-up body and then supported by the support body. Each of the interior inclined surface and the support body may have a substantially similar inclined surface.

The air cleaner body may include an air cleaner sub-body into which the exterior air is introduced. The door may be a hinged door having a door hinge and may be coupled to the air cleaner body. The filter may include filter paper configured to filter out foreign substances from the exterior air and a filter casing filled with the filter paper to maintain a shape and durability of the filter paper with the packing provided on the filter casing.

In accordance with another exemplary embodiment of the present invention an intake system may include a drawer type air cleaner having a positioning rib formed on a hinged door provided on an air cleaner body that intakes exterior air and discharges fresh air and a locking handle disposed in the air cleaner body and disposed on a filter that eliminates foreign substances from the exterior air and an intake manifold that supplies the fresh air formed by the elimination of foreign substances from the exterior air introduced into the drawer air cleaner.

In accordance with an exemplary embodiment of the present invention, a vehicle may include an intake system configured to supply, to an engine fresh air formed by filtering out foreign substances from exterior air introduced into a drawer type air cleaner. The drawer type air cleaner may include a positioning rib formed on a hinged door disposed on an air cleaner body that suctions the exterior air and discharges the fresh air and a locking handle disposed in the air cleaner body and disposed on a filter to eliminate foreign substances from the exterior air. The drawer type air cleaner may further include a mounting bracket. The drawer type air cleaner may be mounted by the mounting bracket to the engine compartment in which the engine and the intake system are disposed.

According to the present invention, a filter protector used in a drawer type air cleaner may include a locking handle of a filter casing and a positioning rib of a door so that despite maintaining the structural simplicity the way it is, the following advantages and effects may be realized by combination of the positioning rib and the locking handle.

First, the positioning rib may position the locking handle at a more accurate lock position to provide an airtight seal of the filter to reliably secure and consistently maintain the filter.

Second, when the locking handle is retained at a correct support position by the positioning rib, the filter may be prevented from drooping or loosening due to durability-related factors such as vibration or impact.

Third, due to the complementary structure of the positioning rib and the locking handle, the filter protector may be prevented from being damaged even when the door is forcibly closed and locked by mistake or carelessness of a worker during maintenance work.

Fourth, when maintenance work is performed, the airtightly assembled state of the filter may be secured without requiring a worker's visual check. Consequently, convenience in maintenance work may be improved.

Fifth, as a change in location of the filter protector is not required, the present invention may improve the performance of an existing drawer type air cleaner including a filter protector without a structural change.

Furthermore, a vehicle with an intake system including a drawer type air cleaner having a filter protector according to the present invention, may provide an airtight seal of the filter e reliably and consistently to eliminate the possibility of foreign substances being drawn into a clean side of the filter, whereby abrasion of an engine or damage to an air filtration system (AFS) of the intake system due to foreign substances may be prevented. Consequently, the vehicle may be used without problems that may include a reduction the lifetime of the engine, a malfunction of the vehicle, or an increase in exhaust emissions, which may be caused by foreign substances.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
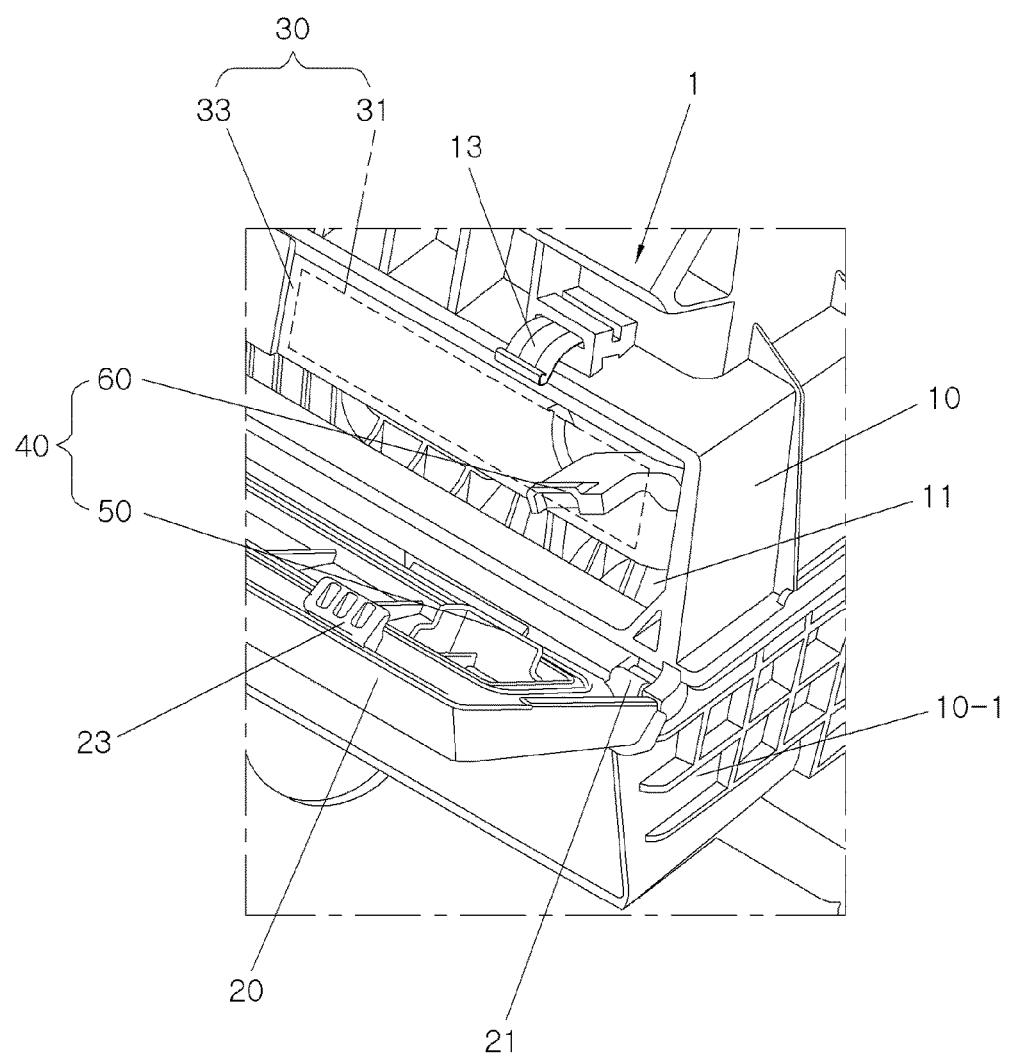
FIG. 1 illustrates an exemplary configuration of a drawer type air cleaner having a filter protector for improving convenience in maintenance work according to an exemplary embodiment of the present invention.

Hereinafter, the exemplary embodiment of the present invention will be described in detail with reference to the accompanying drawings to allow those skilled in the art to easily practice the present invention. Advantages and features of the present invention and methods for achieving the same will be clearly understood with reference to the following detailed description of embodiments in conjunction with the accompanying drawings. However, the present invention is not limited to the embodiments disclosed herein, but may be implemented in various different forms. The embodiments are merely given to make the disclosure of the present invention complete and to completely instruct the scope of the invention to those skilled in the art, and the present invention should be defined by the scope of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 illustrates an exemplary configuration of a drawer type air cleaner 1 according to an exemplary embodiment of the present invention. As shown in the drawing, the drawer type air cleaner 1 may include an air cleaner body 10, an air cleaner sub-body 10-1, a door 20, a filter 30, and a filter protector 40. Therefore, the drawer type air cleaner 1 may include a filter protector type.

In an exemplary embodiment, the air cleaner body 10 may include a rectangular filter receiving cavity 11 that receives the filter 30. A body hook 13 may be disposed on the air cleaner body 10 around an opening side of the filter receiving cavity 11. The body hook 13 may be configured to be locked to a door hook 23 of the hinged door 20 to obstruct the opening of the filter receiving cavity 11 from the exterior when the door 20 is closed and may be retained in a locked state. The air cleaner sub-body 10-1 may form a lower part of the air cleaner body 10 and may provide a passage through which introduced exterior air (e.g., air including foreign substances) may be discharged as fresh air (air from which foreign substances are filtered out) after passing through the filter 30. Accordingly, the air cleaner body 10 and the air cleaner sub-body 10-1 define the overall appearance and size of the air cleaner.

In an exemplary embodiment, the door 20 may include a hinged door structure using a door hinge 21 and may be coupled to the air cleaner body 10 that allows the filter 30 to be drawn out of the filter receiving cavity 11 or inserted into the filter receiving cavity 11 in a drawer manner. Furthermore, the door 20 may include the door hook 23. In particular, when the door 20 is closed, the door hook 23 may be coupled to the body hook 13 disposed around the opening side of the filter receiving cavity 11 to retain the door 20 in a locked state.

In an exemplary embodiment, the filter 30 may have a rectangular shape to be received in the filter receiving cavity 11. The filter 30 inserted into the filter receiving cavity 11 may be integrated with the air cleaner body 10 by locking the door 20 without being exposed to the exterior. Accordingly, exterior air introduced into the air cleaner sub-body 10-1 may be purified by the filter 30 and then discharged as fresh air. For example, the filter 30 may include filter paper 31 formed from various types of materials including non-woven fabric and filters out foreign substances from air. A filter casing 33 that may be filled with the filter paper 31 may maintain the shape of the filter paper 31 and the durability thereof and filter clips 35 (refer to FIG. 6) may be disposed on both left and right sides of the filter casing 33, and a rod shaft of a locking handle 60 that corresponds to the filter protector 40 may be rotatably inserted in to each filter casing 33.

In an exemplary embodiment, the filter protector 40 may include a positioning rib 50 disposed on an interior surface of the door 20 and the locking handle 60 may be disposed adjacent to the filter 30 and coupled with the filter casing 33 of the filter 30. With regard to the filter protector 40, when the door 20 opens, the positioning rib 50 and the locking handle 60 may be configured to move away from each other and when the door 20 is closed, the positioning rib 50 and the locking handle 60 may be configured to contact each other. Particularly, even when the locking handle 60 is positioned at an incomplete lock position due to incorrect filter locking manipulation, the position rib 50 may be configured to forcibly apply a pressure to the locking handle 60 to a full lock position during an operation of closing the door 20. Furthermore, in the locked state of the door 20, the positioning rib 50 may dispose the locking handle 60 at the full lock position and may support a lower portion of the locking handle 60.

Figure 2:
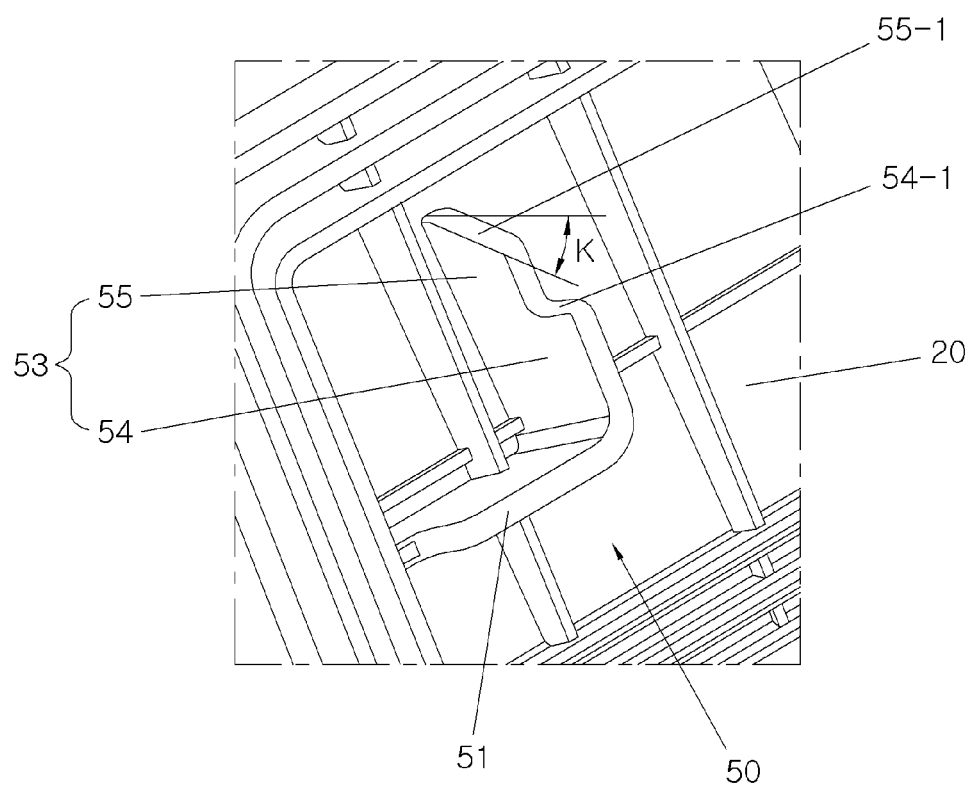
FIG. 2 is an exemplary view showing detailed configuration of a positioning rib constituting the filter protector according to an exemplary embodiment of the present invention.
Figure 3:
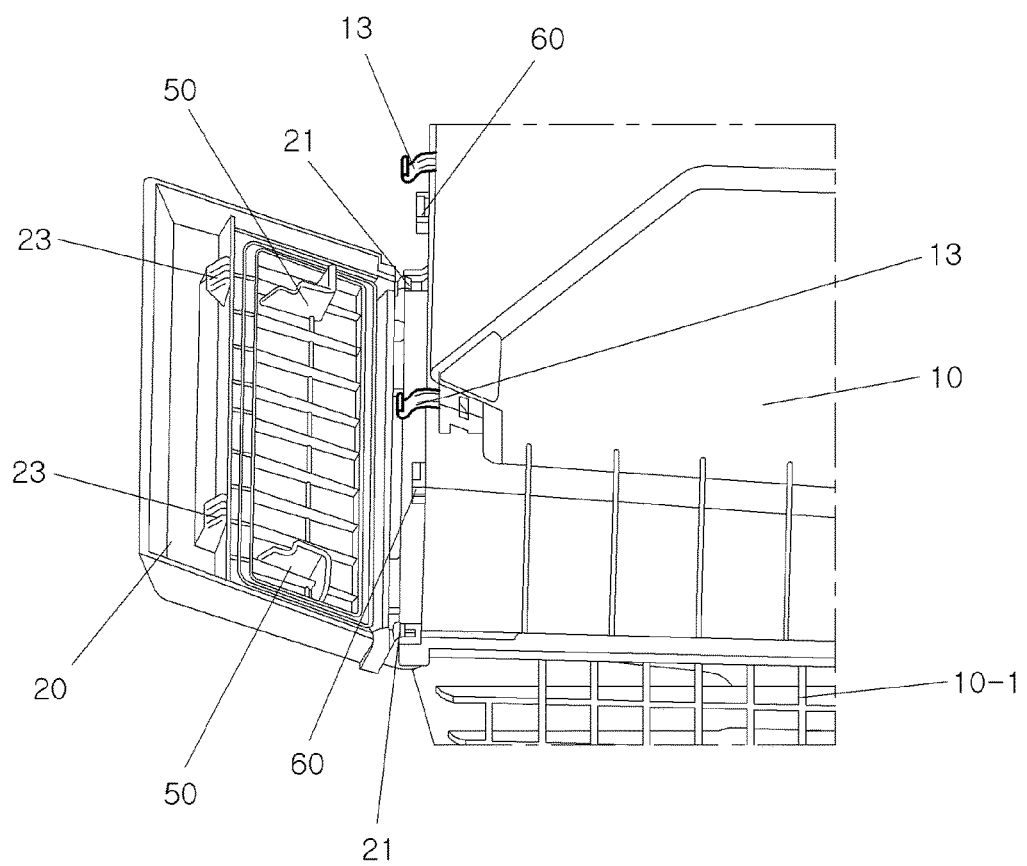
FIG. 3 illustrates an exemplary layout in which the positioning rib is applied to a door according to an exemplary embodiment of the present invention.

FIGS. 2 and 3 illustrate a detailed structure of the positioning rib 50 which is an element of the filter protector 40. Referring to FIG. 2, the positioning rib 50 may include a base protrusion 51 and a manipulation protrusion 53 which protrude from the interior surface of the door 20 and may be integrally formed with the door 20. When the manipulation protrusion 53 is bent at about 90 degrees from the base protrusion 51, the positioning rib 50 may form an "L" shape. During a process of injection-molding the door 20, the positioning rib 50 may be integrally formed with the door 20 by injection molding.

In particular, when the manipulation protrusion 53 is formed with a stopper 54-1, a portion of the manipulation protrusion 53 below the stopper 54-1 may be defined as a push-up body 54 which protrudes to about the same height as that of the base protrusion 51 and a portion of the manipulation protrusion 53 over the stopper 54-1 may be defined as a support body 55 which protrudes to a height lower than the push-up body 54. The support body 55 may be formed with an exterior inclined surface 55-1 which is inclined at an acute angle toward the push-up body 54. Thus, during the operation of closing the door 20, the push-up body 54 may be configured to forcibly apply a pressure using the stopper 54-1 in an upward direction of the locking handle 60 positioned at an incomplete lock position due to incorrect filter locking manipulation. The position of the locking handle 60 may be reliably converted from the incomplete lock position to the full lock position. Furthermore, the support body 55 may support the lower portion of the locking handle 60 in the full lock position and may prevent the locking handle 60 from undesirably drooping due to vibration, impact, or the like.

Referring to a layout of FIG. 3, the positioning rib 50 may be disposed at each of the left and right sides of the interior surface of the door 20. The two positioning ribs 50 may respectively manipulate the two locking handles 6 that are disposed at both left and right sides of the filter 30. In addition, both left and right positions of the positioning ribs 50 may respectively, correspond to the two door hooks 23 that are disposed on the interior surface of the door 20.

Figure 4:
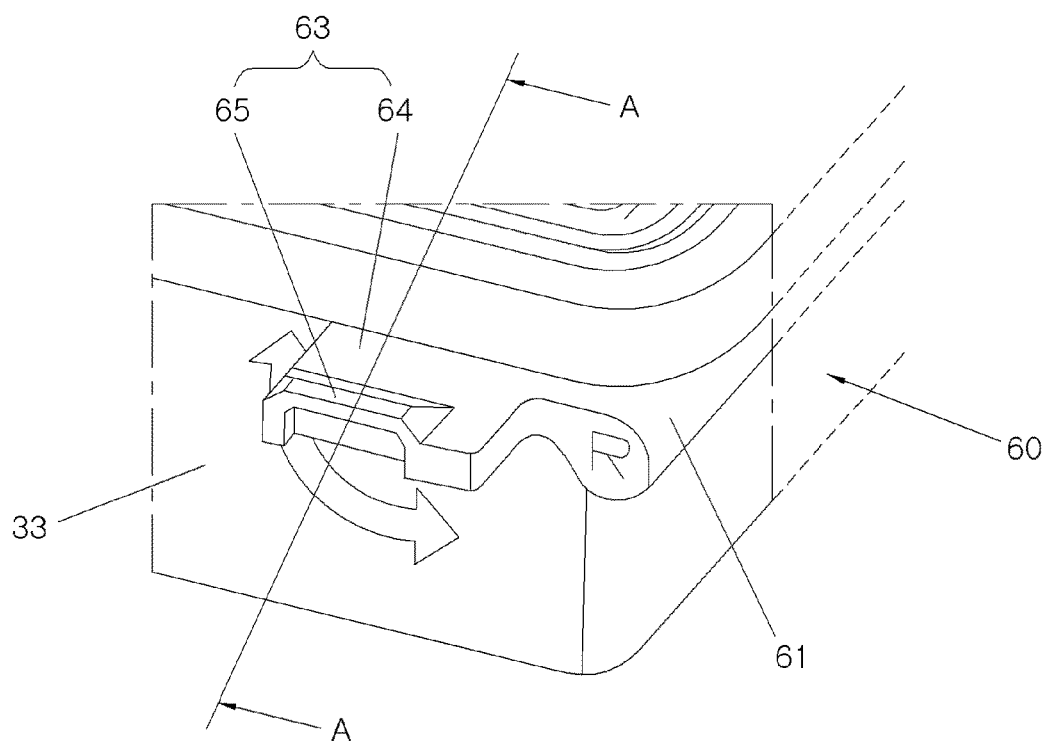
FIG. 4 is an exemplary view showing detailed configuration of a locking handle constituting the filter protector according to an exemplary embodiment of the present invention.
Figure 5:
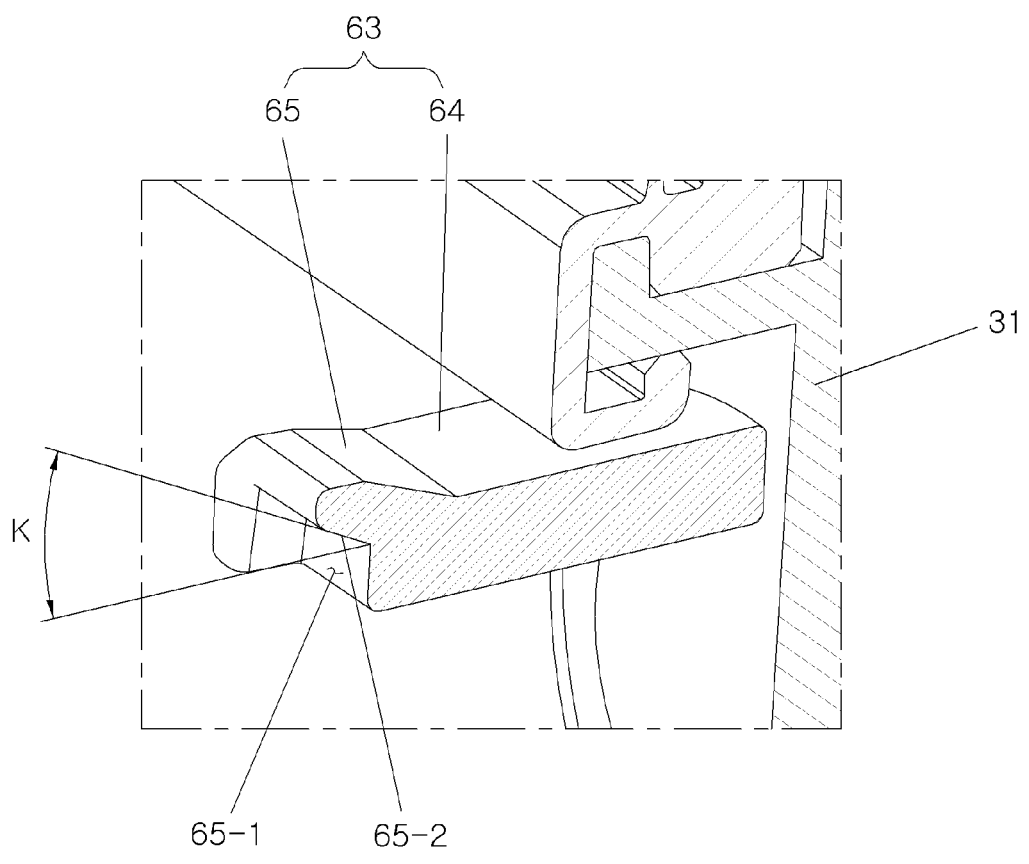
FIG. 5 is an exemplary sectional view of a locking handle according to an exemplary embodiment of the present invention.
Figure 6:
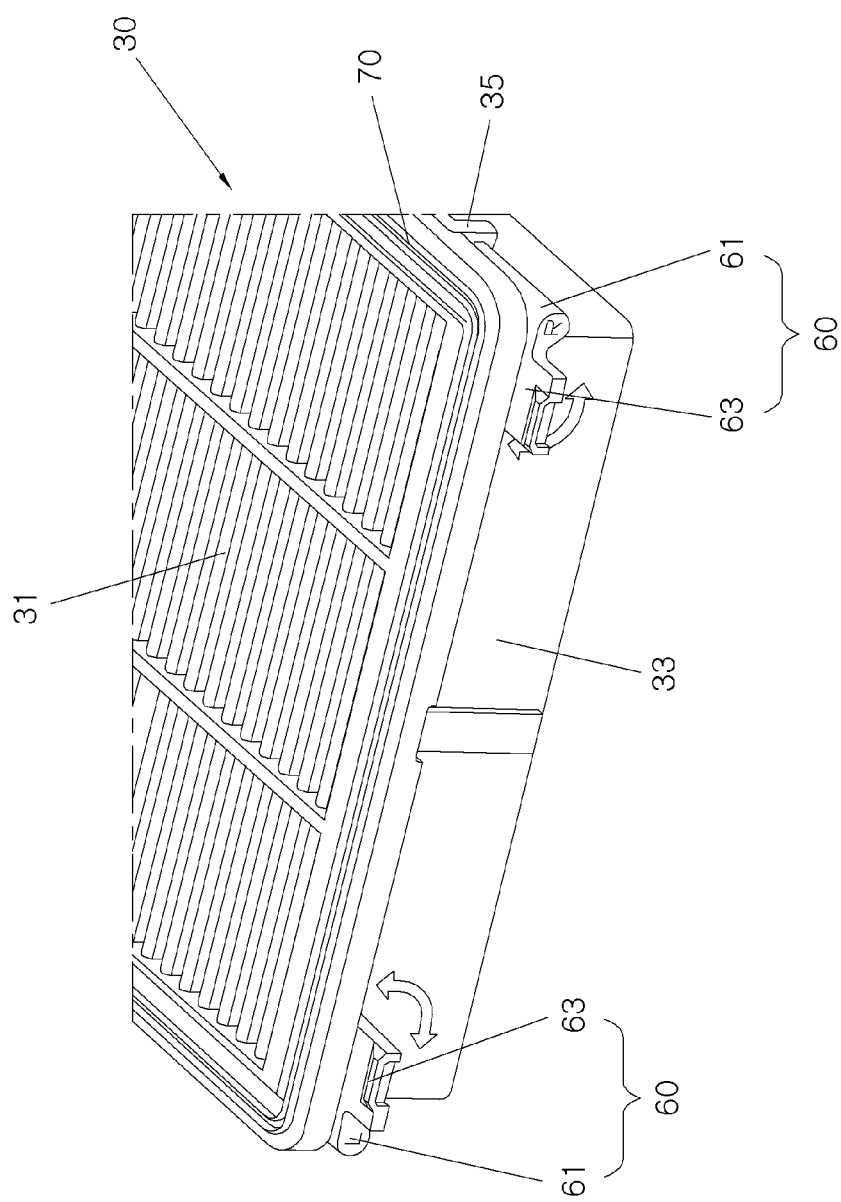
FIG. 6 illustrates an exemplary view of a layout in which the locking handle is applied to a filter according to an exemplary embodiment of the present invention.

FIGS. 4, 5 and 6 illustrate a detailed structure of the positioning rib 60 which is an element of the filter protector 40. Referring to FIGS. 4 and 5, the locking handle 60 may include the rod shaft 61 and a handle 63. In particular, the rod shaft 61 may be inserted into the filter clips 35 (refer to FIG. 6) disposed on the side surface of the filter casing 33 of the filter 30 to enable manipulation of the handle 63 in a counterclockwise direction (e.g., an unlocking direction) or a clockwise direction (e.g., a locking direction), the rod shaft 61 may function as the center of rotation of the handle 63. Furthermore, the rod shaft 61 may be disposed adjacent to a packing 70 and may include a compression portion configured to apply pressure to the packing 70 in an upward direction and compress the packaging. Accordingly, when the handle 63 is rotated in a clockwise direction, the packing 70 may be compressed by the rod shaft 61. The air tightness between an interior surface of the filter receiving cavity 11 and the packing 70 of the filter 30 may be secured. The structure of the rod shaft 61 may be the same as that of the typical structure of the locking handle 60.

In detail, the handle 63 may be integrally formed on one end of the rod shaft 61 and bent at about a 90 degrees from the rod shaft 61. The handle 63 may further protrude from the rod shaft 61 to enable a worker to hold it. The handle 63 may include a grip body 64 which has a plate shape to allow the worker to hold it with his/her hand and a locking protrusion 65 which protrudes from the grip body 64. The locking protrusion 65 may include a positioning depression 65-1 which forms an open cavity in a side surface of the grip body 64. An interior inclined surface 65-2 may be inclined at an acute angle K to expand the volume of an upper portion of the positioning depression 65-1. The acute angle K of the interior inclined surface 65-2 may be about the same as the acute angle K of the support body 55. The locking protrusion 65 may be pushed upward by the push-up body 54 of the positioning rib 50 and supported by the support body 55 and may function as a complementary structure with the manipulation protrusion 53.

In an exemplary embodiment, the positioning depression 65-1 may be an insert passage through which the push-up body 54 is inserted into the grip body 64 through the process of closing the door 20. In other words, when the door 20 is closed along a closing path, the push-up body 54 may be configured to push the grip body 64 upward. The handle 63 that is located at an incomplete position due to incorrect filter locking manipulation may be forcibly pushed upward and converted to the full lock position through the process of closing the door 20. When the grip body 64 is completely pushed upward by the push-up body 54, the interior inclined surface 65-2 may be brought into contact with the support body 55 and thus may support the lower portion of the handle 63 disposed at the full lock position. Accordingly, the handle 63 may be prevented from undesirably drooping due to vibration, impact, or the like. In particular, the acute angle K of the interior inclined surface 65-2 of the locking protrusion 65 may prevent interference which may be caused when the push-up body 54 is inserted into the positioning depression 65-1.

Referring to the layout of FIG. 6, the locking handle 60 may be disposed at each of the left and right sides of the filter casing 33 of the filter 30. The two locking handles 60 may be respectively connected to the two positioning ribs 50 that are disposed at both left and right sides of the interior surface of the door 20. With regard to each locking handle 60, the rod shaft 61 may extend a predetermined length from the handle 63 inserted into to the filter clips 35 which are disposed on both left and right sides of the filter casing 33. When the handle 63 is rotated in the counterclockwise direction, the locking handle 60 may be unlocked from the air cleaner body 10. When the handle 63 is rotated in the clockwise direction, the locking handle 60 may be locked to the air cleaner body 10. For example, the locking of the locking handle 60 to the air cleaner body 10 may cause the filter 30 to compress the packing 70 to a sufficient degree, thus preventing a lack of sealing between the clean side (e.g., the cavity around the filter paper 31) and the dirty side (e.g., the cavity around the filter casing 33).

Figure 7:
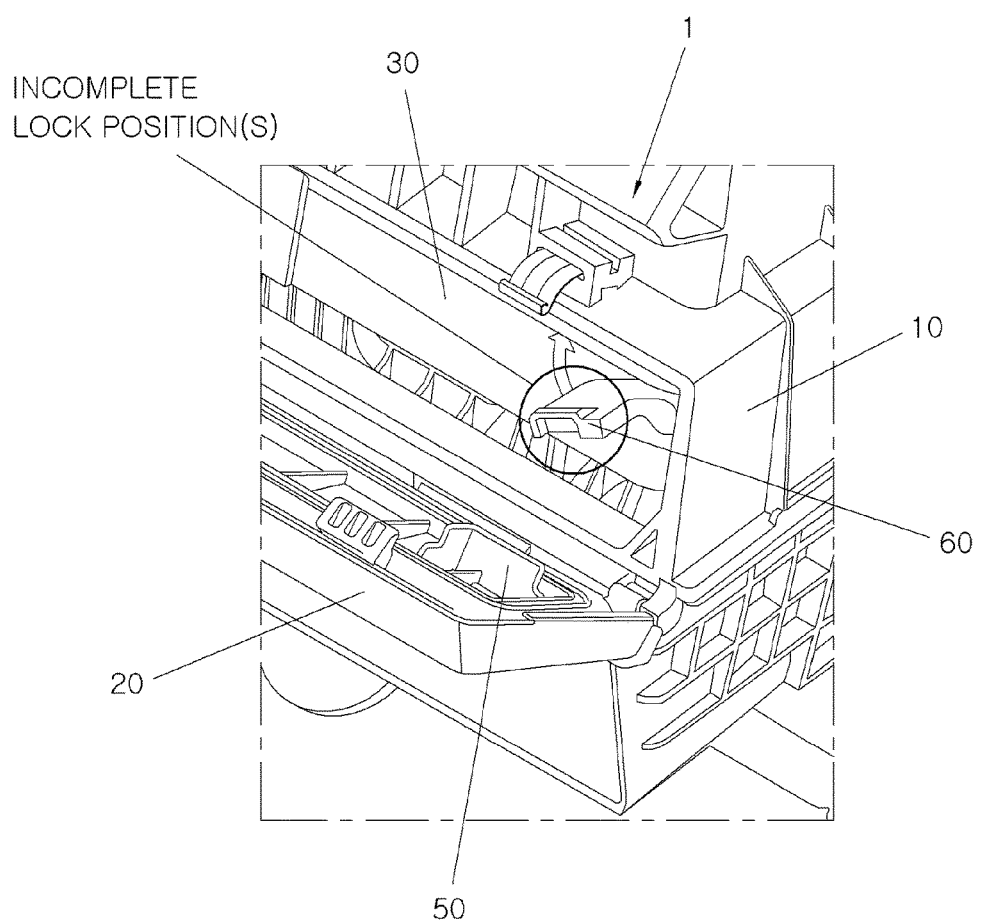
FIGS. 7 to 11 are exemplary views illustrating the operation states of a filter protector using a complementary structure between the positioning rib and the locking handle according to an exemplary embodiment of the present invention.

FIGS. 7 to 11 are exemplary views illustrating the operation states of the filter protector using the complementary structure between the positioning rib and the locking handle according to the present invention. FIG. 7 shows a state when the door 20 of the drawer type air cleaner 1 may be closed despite the fact that the locking handle 60 is at an incomplete lock position S due to mistake or carelessness of the worker, after the filter 30 is replaced with a new one through the opened door 20. In particular, the locking handle 60 of the filter 30 may be disposed in the filter receiving cavity 11 of the air cleaner body 10 when it does not reach the full lock position due to an incorrect manipulation of the handle 63 by the worker.

Figure 8:
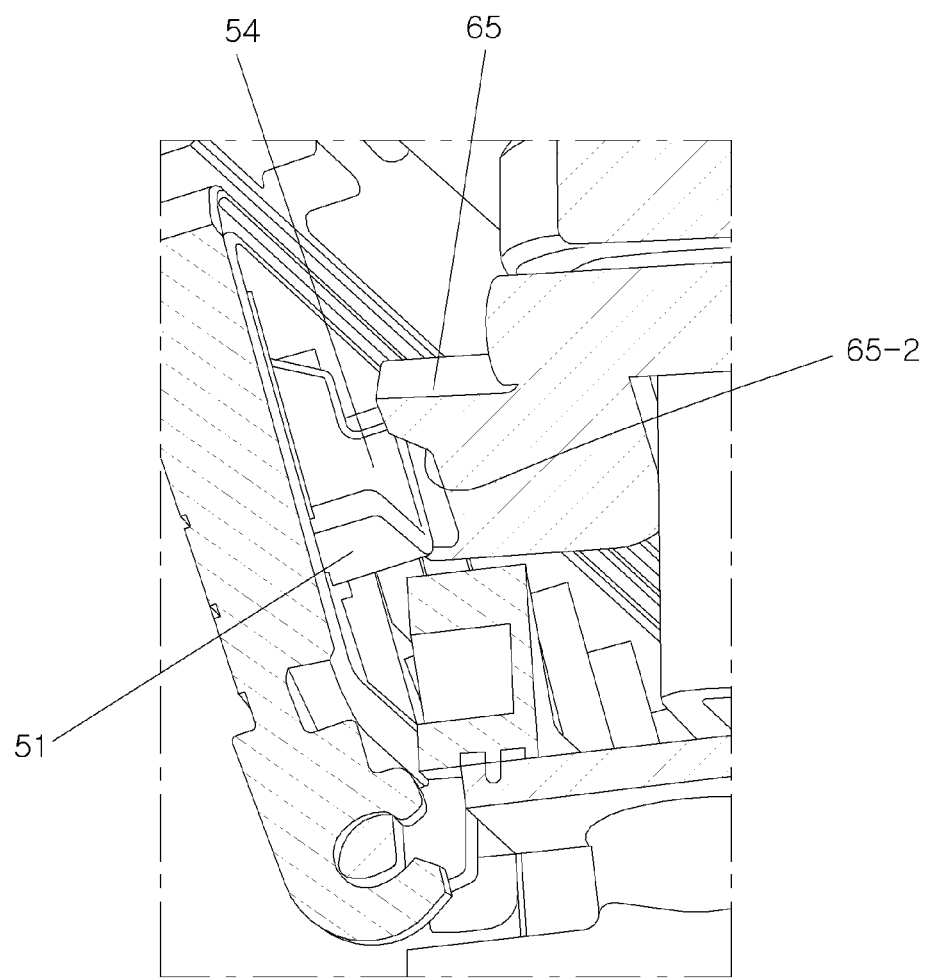

FIG. 8 shows an initial stage of the operation of forcibly closing the door 20. In the initial stage of the closing operation, the push-up body 54 of the manipulation protrusion 53 of the positioning rib 50 may be positioned onto the interior inclined surface 65-2 of the locking protrusion 65 of the locking handle 60. At this time, the acute angle K of the interior inclined surface 65-2 may prevent interference which may be caused when the push-up body 54 is inserted into the positioning depression 65-1.

Figure 9:
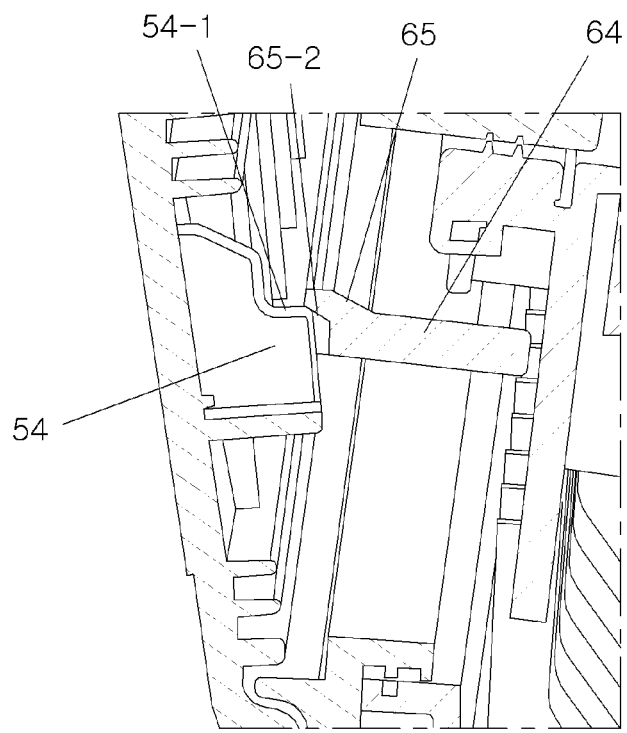

FIG. 9 shows a state in which the operation of closing the door 20 is being performed by forcible manipulation of the worker. When closing the door 20, the push-up body 54 may be configured to push the locking protrusion 65 using push force generated when the door 20 is closed. Consequently, the push force may be divided into a horizontal component and a vertical component by the acute angle K of the interior inclined surface 65-2. The vertical component of the push force may be configured to push the locking protrusion 65 upward. The upward movement of the locking protrusion 65 may allow the handle 63 to be rotated in the clockwise direction (e.g., locking direction) with the rod shaft 61 as the center of rotation.

Figure 10:
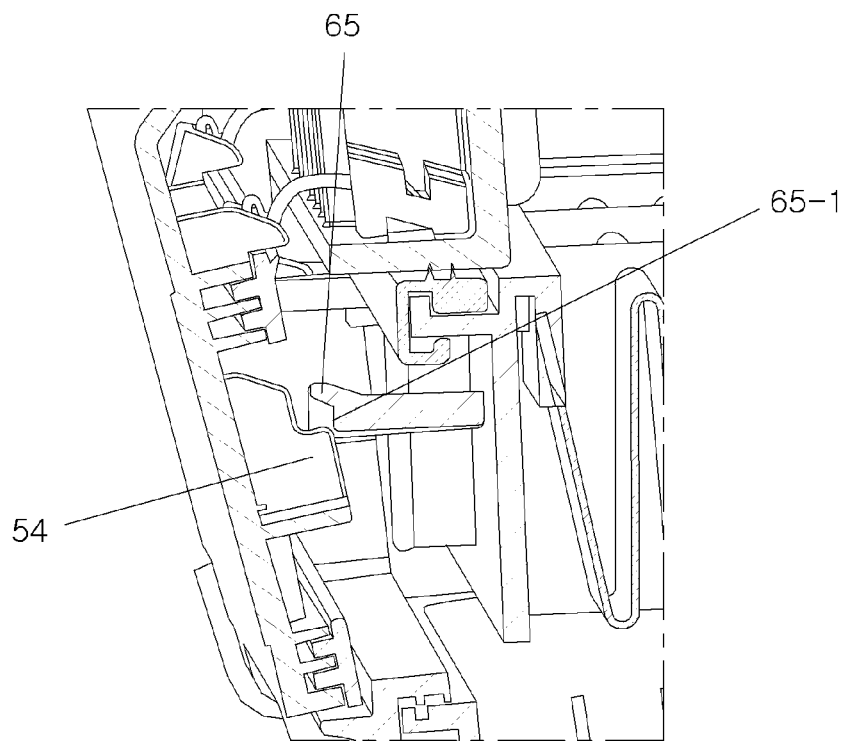

FIG. 10 shows an intermediate stage of the operation of closing the door 20 by the forcible manipulation of the worker. In the intermediate stage of the closing operation, the locking protrusion 65 may be moved upward when continuously pushed upward by the vertical component of the push force. Ultimately, when the push-up body 54 is disposed at the end of the interior inclined surface 65-2, the upward movement of the locking protrusion 65 may be stopped. As a result, the handle 63 that has been rotated in the clockwise direction may reach the full lock position. Accordingly, the locking handle 60 may be converted to an automatic locking state. Therefore, in the drawer type air cleaner 1, even when there is mistake or carelessness of the worker, the airtightness of the packing 70 may be secured merely by the operation of closing the door 20. For example, the packing 70 may form an overlap of about 0.7 mm. This may be a set value to secure an airtight seal.

Figure 11:
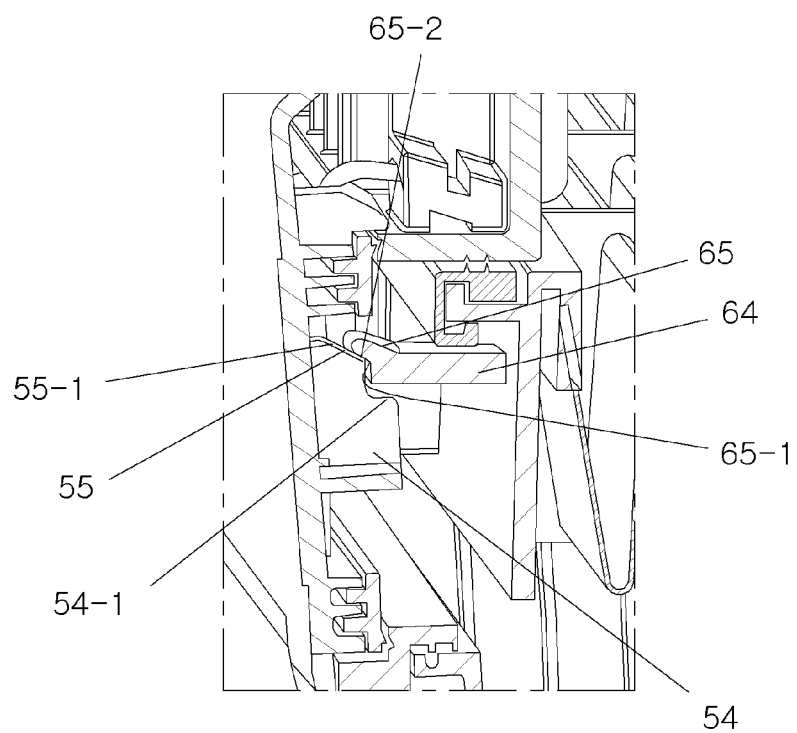

FIG. 11 shows a state in which the door 20 is locked by the forcible manipulation of the worker. In the locked state, the interior inclined surface 65-2 of the locking protrusion 65 and the outer inclined surface 55-1 of the support body 55 may be brought into close contact with each other. Thereby, the handle 63 may be more stably supported by the coupling between the locking protrusion 65 and the support body 55. Consequently, the locking handle 60 may be prevented from drooping or loosening due to incorrect assembly or vibration/impact applied to the drawer type air cleaner 1.

Figure 12:
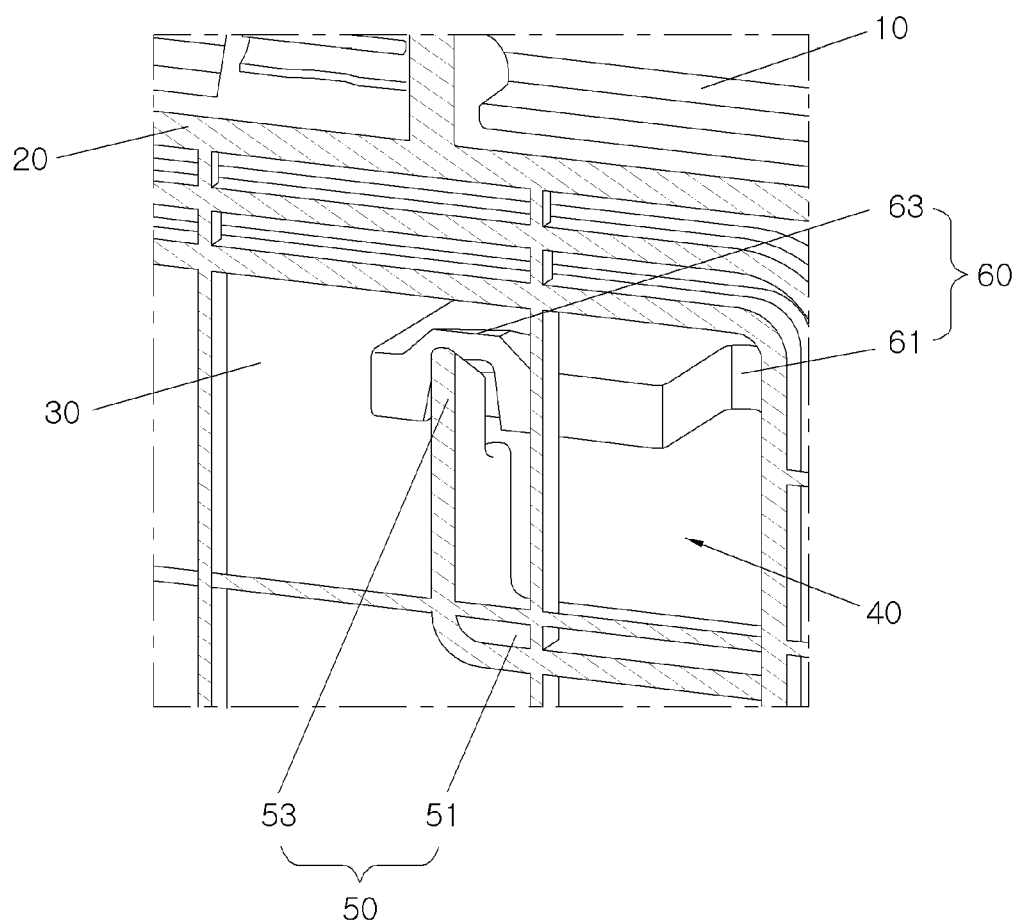
FIG. 12 shows an exemplary operation state of the filter protector using the complementary structure between the positioning rib and the locking handle according to an exemplary embodiment of the present invention.

FIG. 12 shows the operation state of the filter protector 40 using the complementary structure between the positioning rib 50 and the locking handle 60 in the locked state of the door 20. As shown in the drawing, even when an incorrect assembly occurs after replacement of the filter 30, the filter protector 40 may automatically form the full locked state of the locking handle 60 without requiring a worker's visual check. Accordingly, the airtight seal of the packaging 70 may be secured. Additionally, the filter protector 40 may prevent the filter 30 from drooping or loosening due to durability-related factors such as vibration or impact applied to the drawer type air cleaner 1.

Figure 13:
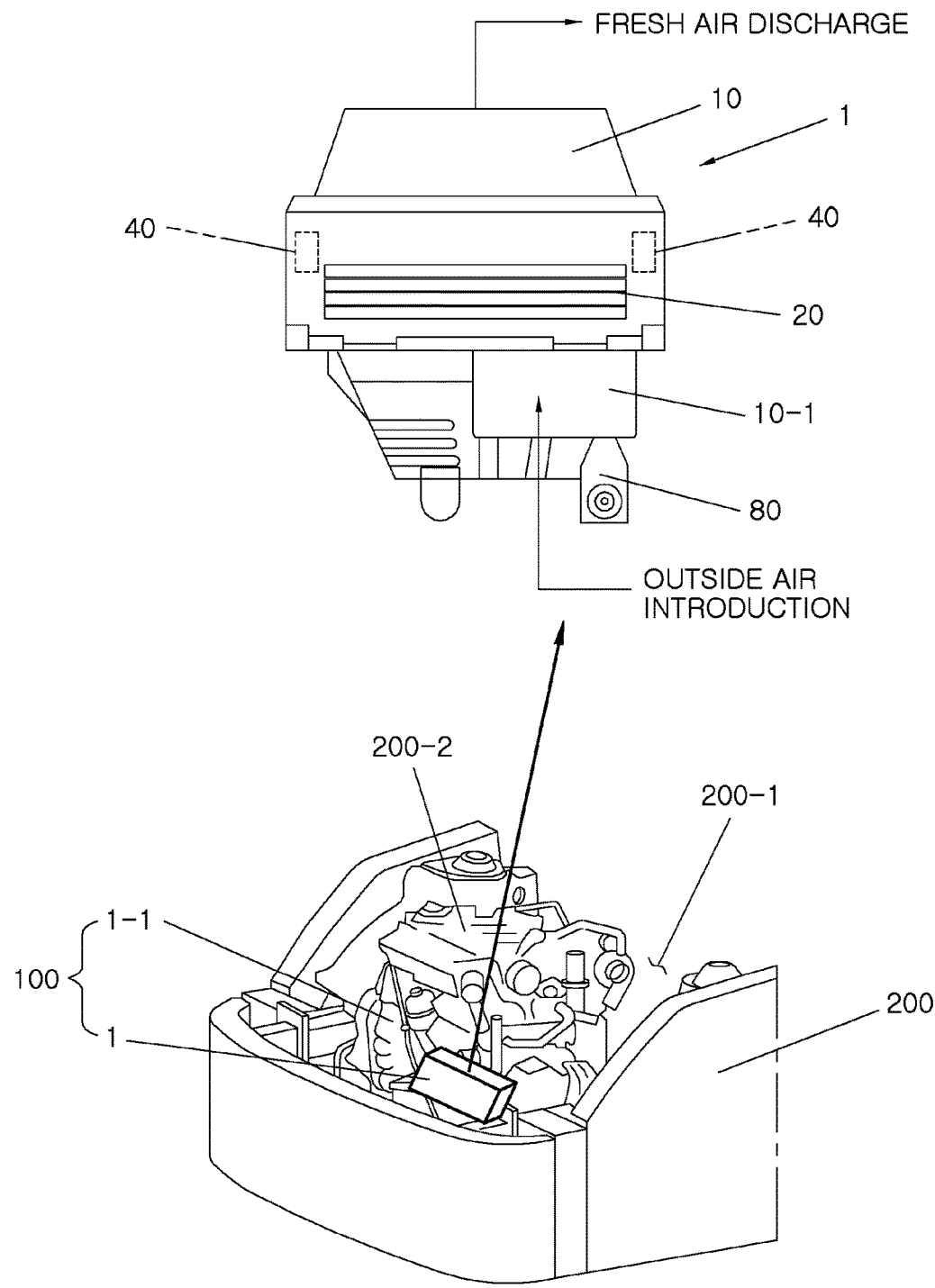
FIG. 13 is an exemplary view showing an example of a vehicle to which an intake system including the drawer type air cleaner with the filter protector according to an exemplary embodiment the present invention is applied.

FIG. 13 illustrates an example of a vehicle of which an engine compartment 200-1 is partially open. As shown in the drawing, an intake system 100 along with an engine 200-2 may be disposed in the engine compartment 200-1 of the vehicle 200. The engine 200-2 may be one of various types of engines, for example, a gasoline engine, a diesel engine, an liquefied petroleum gas (LPG) engine, a compressed natural gas (CNG) engine, etc.

In an exemplary embodiment, the intake system 100 may include an intake manifold 1-1 to supply fresh air to the engine 200-2. The drawer type air cleaner 1 may be coupled to the intake manifold 1-1 to supply fresh air. The drawer type air cleaner 1 may be coupled to an exterior air introduction pipe of the intake system 100 by the air cleaner sub-body 10-1, and may filter out foreign substances from introduced exterior air and thus forms fresh air.

The drawer type air cleaner 1 may be the same as the drawer type air cleaner 1 having a filter protector type structure that has been described with reference to FIGS. 1 to 12. The drawer type air cleaner 1 shown in FIG. 13 may further include a mounting bracket 80. The mounting bracket 80 may be provided to couple mounting the drawer type air cleaner 1 to the intake manifold 1-1 to the engine compartment 200-1. Therefore, the mounting bracket 80 may have a bolt aperture through fastened by a bolt to a vehicle body frame in the engine compartment 200-1 or the intake system 100, or may include a clamp to fix the mounting bracket 80 to the vehicle body frame or the intake system 100.

As described above, in a drawer type air cleaner according to an exemplary embodiment of the present invention, a positioning rib 50 may be disposed on a hinged door 200 installed on an air cleaner body 10 into which exterior air is introduced and from which fresh air discharged. A locking handle 60 may be disposed on a filter 30 disposed in the air cleaner body 10 and may filter out foreign substances from exterior air. Even in an incomplete locked state in which the filter 30 does not reliably compress the packing 70 when a door 20 is closed the positioning rib 50 interlocked with the operation of closing the door 20 may dispose the locking handle 60 in a full locked state to reliably compress the packing 70 by the filter 30. The airtightness of the filter 30 may be secured. Therefore, when a vehicle with the drawer type air cleaner 1 combined with an intake system 100 has maintenance or replacement of the filter 30 performed, the airtightly assembled state of the filter 30 may be secured without requiring a worker's visual check. Consequently, convenience in maintenance or replacement may be realized.

While the present invention has been described with respect to the specific exemplary embodiments, it will be apparent to those skilled in the art that various changes and modifications may be made without departing from the spirit and scope of the invention as defined in the following claims.

What is claimed is:

1. A drawer type air cleaner having increased maintenance convenience, comprising:
   a door configured to open or close an opening of a filter receiving cavity formed in an air cleaner body that suctions exterior air and discharges fresh air;
   a filter disposed in the filter receiving cavity and configured to filter out foreign substances from the exterior air and convert the exterior air into fresh air, wherein the filter includes a packing in a state in which the filter is disposed in the filter receiving cavity, and provides an airtight seal between the filter and the filter receiving cavity; and
   a filter protector configured to be interlocked with an operation of closing the door to convert the filter from an incompletely coupled position when the filter disposed in the filter receiving cavity is not able to compress the packing into a fully coupled state in which the filter compresses the packing,
   wherein the filter protector includes a positioning rib which is comprised of a base protrusion and a manipulation protrusion; and a locking handle which is comprised of a locking protrusion,
   wherein the manipulation protrusion includes a push-up body which is configure to push the handle upward, and the support body which is configured to support the handle, and
   wherein the push-up body is configured to push the locking protrusion using push force generated when the door is closed, wherein a vertical component of the push force is configured to push the locking protrusion upward so as to rotate in the locking direction.

2. The drawer type air cleaner of claim 1, wherein the filter protector includes:
   the positioning rib disposed on an interior side of the door; and
   the locking handle rotatably coupled to a side surface of the filter to enable the filter to compress the packing onto an interior surface of the filter receiving cavity.

3. The drawer type air cleaner of claim 2, wherein the positioning rib protrudes from the door toward a front surface of the filter, and the locking handle includes a rod shaft coupled to the side surface of the filter and a handle positioned on the front surface of the filter.

4. The drawer type air cleaner of claim 1, wherein
the manipulation protrusion is bent from the base protrusion at about 90 degrees, and
wherein the manipulation protrusion is configured to convert by closing the door, a position of the handle from an incomplete manipulation position with uncompressed packing to a full manipulation position.

5. The drawer type air cleaner of claim 4, wherein the base protrusion and the manipulation protrusion form an "L" shape.

6. The drawer type air cleaner of claim 1, wherein the push-up body and the support body that are divided from each other by a stopper.

7. The drawer type air cleaner of claim 1, wherein the locking protrusion includes a positioning depression configured to receive the push-up body, and an interior inclined surface that contacts the push-up body and is supported by the support body.

8. The drawer type air cleaner of claim 7, wherein each of the interior inclined surface and the support body has an identical inclined surface.

9. The drawer type air cleaner of claim 8, wherein an inclination angle of the inclined surface is an acute angle.

10. The drawer type air cleaner of claim 2, wherein the positioning rib and the locking handle include two positioning ribs and two locking handles that are disposed in pairs at positions adjacent to each other.

11. The drawer type air cleaner of claim 1, wherein the air cleaner body includes an air cleaner sub-body configured to receive the exterior air.

12. The drawer type air cleaner of claim 1, wherein the door is a hinged door with a door hinge and is coupled to the air cleaner body.

13. The drawer type air cleaner of claim 1, wherein the filter includes:
filter paper configured to filter out foreign substances from the exterior air; and
a filter casing filled with the filter paper to maintain a shape and durability of the filter paper with the packing disposed on the filter casing.

14. An intake system, comprising:
a drawer type air cleaner as defined in claim 1 that includes a positioning rib formed on a hinged door disposed on an air cleaner body that suctions exterior air and discharges fresh air, and
a locking handle disposed in the air cleaner body and disposed on a filter configured to filter out foreign substances from the exterior air; and
an intake manifold supplied with the fresh air formed by filtering out foreign substances from the exterior air introduced into the drawer air cleaner.

15. A vehicle comprising:
an intake system configured to supply to an engine fresh air formed by filtering out foreign substances from exterior air introduced into a drawer type air cleaner as defined in claim 1, wherein the drawer type air cleaner includes a positioning rib formed on a hinged door disposed on an air cleaner body that suctions the exterior air and discharges the fresh air; and
a locking handle disposed in the air cleaner body and disposed on a filter configured to filter out foreign substances from the exterior air.

16. The vehicle of claim 15, wherein the drawer type air cleaner includes a mounting bracket, wherein the drawer type air cleaner is coupled by the mounting bracket to the engine compartment in which the engine and the intake system are provided.

* * * * *